United States Patent Office 3,448,146
Patented June 3, 1969

3,448,146
PROCESS FOR PURIFYING TEREPHTHALIC ACID
Henri K. Lese, McKeesport, John H. McCracken, Pitcairn, and Johann G. D. Schulz, Pittsburgh, Pa., assignors to Gulf Research & Development Company, Pittsburgh, Pa., a corporation of Delaware
No Drawing. Continuation-in-part of application Ser. No. 376,586, June 19, 1964. This application Dec. 13, 1965, Ser. No. 513,528
Int. Cl. C07c 51/20, 51/48, 51/16
U.S. Cl. 260—525    7 Claims

ABSTRACT OF THE DISCLOSURE

A processs for purifying terephthalic acid in a mixture obtained as a result of the oxidation of para xylene with oxygen or nitric acid which involves treating such mixtures with a mixture of a lower alcohol and a carbonyl-containing compound or a diether.

---

This is a continuation-in-part application of our application Ser. No. 376,586, filed June 19, 1964, and now Patent No. 3,370,088.

This invention relates to a process for purifying an aromatic acid selected from the group consisting of benzophenone 4,4'-dicarboxylic acid and terephthalic acid, and, more particularly, relates to a process for separating benzophenone 2,4'-dicarboxylic acid from a mixture containing the same and benzophenone 4,4'-dicarboxylic acid as well as to a process for separating terephthalic acid from a mixture containing the same and one or more impurities admixed therewith, such as part carboxybenzaldehyde, para toluic acid, nitrogen-containing impurities, etc.

When ditolylethane is prepared in accordance with known procedures the mixture obtained will contain from about 50 to about 90 percent by weight of the symmetrical isomer, 1,1-di (p-tolyl) ethane and from about 10 to about 50 percent by weight of the unsymmetrical isomer 1-(o-tolyl), 1-(p-tolyl) ethane. Even when ditolylethane is prepared by condensing one mole of acetaldehyde with two mols of toluene in the manner set forth in U.S. Patent No. 3,002,034 of Schultz, a mixture containing about 80 to about 90 percent by weight of 1,1-di (p-tolyl) ethane and about 10 to about 20 percent by weight of 1-(o-tolyl), 1-(p-tolyl) ethane is obtained. It is practically impossible economically to separate these isomers from each other, since their boiling points are so close to each other.

Ditolylethane can be converted to the corresponding acid by subjecting the same to oxidation conditions in any suitable manner, for example, by following the conditions set forth in U.S. Patent No. 3,075,007 of McCracken et al. Unfortunately, as a result of such oxidation the two diotolylethane isomers defined above, 1,1- di (p-tolyl) ethane and 1-(o-tolyl), 1-(p-tolyl) ethane, are converted to the acids, benzophenone 4,4'-diacarboxylic acid and benzophenone, 2,4'-dicarboxylic acid, respectively.

For many commercial purposes a mixture of the two diacid isomers defined above is not desired. For example, benzophenone 4,4'-dicarboxylic acid can be employed as a starting material for the preparation of linear polyester fibers. The presence of the unsymmetrical isomer, benzophenone 2,4'-dicarboxylic acid, would be detrimental in the preparation of such linear polymers and, accordingly, must be separated from admixture with benzophenone 4,4'-dicarboxylic acid.

When para xylene is oxidized with a gas containing molecular oxygen, as, for example, in U.S. Patent No. 2,853,514 to Brill, or when para xylene is oxidized with nitric acid, as, for example, in U.S. Patent No. 2,636,899 to Burrows et al., the desired terephthalic acid obtained is admixed with a significant amount of impurities, such as para carboxybenzaldehyde and para toluic acid. In the case of the latter process wherein nitric acid is employed as the oxidant significant amounts of nitrogen-containing impurities are also present in admixture with the terephthalic acid.

For many commercial purposes a mixture of terephthalic acid and the defined impurities is not desired. For example, as with benzophenone 4,4'-dicarboxylic acid, terephthalic acid can be employed as a starting material for the preparation of linear polyester fibers. The presence of the defined impurities would be detrimental in the preparation of such linear polymers and, accordingly, must be separated from admixture with terephthalic acid.

We have found that benzophenone 4,4'-dicarboxylic acid and terephthalic acid of improved purity can be obtained from the above mixtures by a procedure which involves treating such mixtures with a mixture containing a selected alcohol and a selected carbonyl-containing compound.

The alcohol that can be employed for the purification procedure defined herein can be defined by the following general formula:

R'OH wherein R' can be an alkyl group having from one to five carbon atoms, such as methyl, ethyl, propyl, butyl and amyl. Examples of such alcohols are methanol, ethanol, n-propanol, isopropanol, n-butanol, n-pentanol, etc. Methanol is the preferred alcohol.

The carbonyl-containing compound that can be employed herein with the alcohol defined above can be defined by the following general formula:

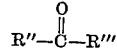

wherein R" and R''', the same or different, are selected from the group consisting of hydrogen and alkyl groups having from one to four carbon atoms, such as methyl, ethyl, propyl and butyl. Examples of such carbonyl-containing compounds are formaldehyde, acetaldehyde, n-propionaldehyde, n-butyraldehyde, acetone, diethylketone, methylethylketone, diisopropylketone, methylpropylketone, ethylpropylketone, diisobutylketone, etc. Acetone is the preferred carbonyl-containing compound.

As pointed out above, we can employ a mixture containing the defined alcohol and the defined carbonyl-containing compound to selectively remove the defined impurities from a mixture containing the same and benzophenone 4,4'-dicarboxylic acid or terephthalic acid. We have noted, however, that during the purification procedure defined herein and under the conditions thereof the mixture of acids being purified acts as a catalytic medium to promote the reaction of the defined alcohol with the defined carbonyl-containing compound to produce a diether. We have also found that such diethers are also effective to selectively remove the defined impurities from a mixture containing the same and benzophenone 4,4'-dicarboxylic acid or terephthalic acid.

The reaction which we believe takes place between the defined alcohol and the defined carbonyl-containing compound under the catalytic effect of the mixture of acids being treated can be defined as follows:

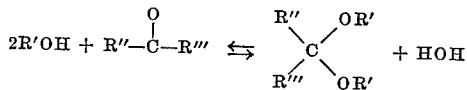

Since the reaction defined above is reversible the mixture employed will be one containing alcohol, carbonyl-containing compound, diether and water.

We have also found that instead of employing a mixture of the defined alcohol and the defined carbonyl-containing compound, the defined diether alone that would be produced as a result of the reaction defined above can be employed in the purification procedure defined herein. Examples of such diethers that can be employed herein are dimethoxymethane, diethoxymethane, 1,1-dimethoxyethane, 1,1-diethoxyethane, 1,1-dipropoxybutane, 1,1-di(tert. butoxy) methane, 2,2-dimethoxypropane, 2,2-diethoxybutane, 2,2-dipropoxy, 4-methylhexane, 3,3-dipentoxypentane, etc. We prefer to employ 2,2-dimethoxypropane.

We have also found that while the alcohol defined above or the carbonyl-containing compound defined above alone will remove some of the defined impurities from the mixture to be purified, that an equivalent amount of a mixture of the alcohol and the carbonyl-containing compound will remove a larger amount of the defined impurities from said mixture than the alcohol or carbonyl-containing compound alone. In addition when a mixture of benzophenone 2,4'-dicarboxylic acid and benzophenone 4,4'-dicarboxylic acid that has been obtained as a result of the nitric acid oxidation of a mixture of the defined symmetrical and unsymmetrical isomers of ditolylethane, or a mixture of terephthalic acid, admixed with the defined impurities, that has been obtained using molecular oxygen or nitric acid as oxidant, is treated with a mixture of alcohol and carbonyl-containing compound, the benzophenone 4,4'-dicarboxylic acid or terephthalic acid recovered has an improved color over that of the charge mixture or even over the product obtained when either the alcohol or the carbonyl-containing compound alone is employed for the defined purification. When the defined diether alone is employed the color of the recovered acid is even improved over that obtained when the mixture of alcohol and carbonyl-containing compound is employed. The color bodies so removed are not believed to be either of the two benzophenone carboxylic acids defined herein but organic compounds containing nitrogen. In the case wherein terephthalic acid is purified herein the color bodies are believed to be nitrogen-containing impurities if nitric acid oxidation was employed. In the case wherein terephthalic acid was obtained by air oxidation color bodies appear to be polymeric in nature.

The treatment defined herein involves merely bringing the mixtures containing the desired dicarboxylic acids in contacts with the mixture of alcohol and carbonyl-containing compound or the defined diether. The alcohol and carbonyl-containing compound employed can be present in the treating mixture over a wide range, for example, in a molar ratio of about 10:1 to about 1:10, but since, as noted, it is believed the alcohol and the carbonyl-containing compound react herein to form a diether, we prefer to employ the same in approximately stoichiometric amounts, that is, about two mols of alcohol to about one mol of the carbonyl-containing compound. The amounts of alcohol and carbonyl-containing compound or of diether that can be employed herein can vary over a wide range. Thus, the mixture of alcohol and carbonyl-containing compound or of diether employed can be at least twice the weight of the mixtures of dicarboxylic acids being treated, but generally will be about five to about 10 times the weight thereof.

The reaction conditions required are not critical. Thus, the temperature employed can be from about 40° to about 300° C., preferably from about 100° to about 200° C. Pressure is not critical and can therefore be from about atmospheric to about 1000 pounds per square inch gauge, or even higher. Preferably the pressure is maintained at about the autogeneous pressure of the reaction mixture which can be, for example, from about atmospheric to about 500 pounds per square inch gauge. The duration of the treatment is similarly not critical, and, for example, can be from about one minute to about 10 hours, preferably from about 30 minutes to about one hour.

As a result of the treatment defined herein we believe substantially all of the defined impurities are dissolved in the treating medium and perhaps a small amount of benzophenone 4,4'-dicarboxylic acid or terephthalic acid is also dissolved therein. The bulk of the latter acids, however, are insoluble in the treating medium. At the end of the treatment the solid benzophenone 4,4'-dicarboxylic acid or terephthalic acid is separated from the treating medium containing the dissolved impurities in any convenient fashion, for example, by filtration or decantation. The solid benzophenone 4,4'-dicarboxylic acid or terephthalic acid left behind can be washed, if desired, for example, using methanol or acetone.

The procedure of this invention can further be understood by reference to the following. The benzophenone dicarboxylic acid mixture that was subjected to treatment in Examples I, II, III and IV was obtained as follows. There was pumped into an autoclave 522.5 grams of ditolylethane and 1500 grams of water, and the mixture was then heated to 140° to 150° C. Over a period of 1.5 hours and while maintaining the contents of the autoclave at the defined temperature there was pumped therein 2075 grams of nitric acid having a concentration of 70 percent. The contents of the autoclave were then raised to 175° to 180° C. over a period of 15 minutes and maintained at the latter temperatures for a period of two hours while the pressure in the autoclave was held at 300 pounds per square inch gauge. At the end of this period, the product was filtered and dried at 150° C. There was obtained 605 grams of the mixture of benzophenone dicarboxylic acids employed herein. Examples I and II below show the results obtained when methanol and acetone, respectively, are employed to separate benzophenone 2,4'-dicarboxylic acid from a mixture containing the same and benzophenone 4,4'-dicarboxylic acid.

EXAMPLE I

Into a one-liter stirred stainless steel autoclave there was placed a slurry of 100 grams of a mixture of crude highly yellow colored benzophenone dicarboxylic acids analyzed to consist essentially of 85 grams of benzophenone 4,4'-dicarboxylic acid and 15 grams of benzophenone 2,4'-dicarboxylic acid and 700 milliliters of methanol. The mixture was heated over a period of one hour at a temperature of 140° C. and a pressure of 140 pounds per square inch gauge. The mixture was cooled to atmospheric temperature and the pressure reduced to atmospheric pressure and then filtered to yield, after drying at 105° C. in a vacuum oven at a vacuum of 20 inches of mercury for two hours, 81.0 grams of a solid product which was analyzed by means of infrared to consist essentially of 76.65 grams of benzophenone 4,4'-dicarboxylic acid and 4.35 grams of benzophenone 2,4'-dicarboxylic acid. There was a slight improvement in the color of the product from the original mixture.

EXAMPLE II

The run of Example I was repeated, except that 700 milliliters of acetone was employed in place of methanol. After filtration, there was obtained 86.0 grams of a mixture which analysis showed contained 82.1 grams of benzophenone 4,4'-dicarboxylic acid and 3.9 grams of benzophenone 2,4'-dicarboxylic acid. There was a slight improvement in the color of the product from the original mixture.

That a synergistic effect is obtained when a mixture of the defined alcohol and the defined carbonyl-containing compound is employed rather than either one alone is shown by the following.

EXAMPLE III

The run of Example I was repeated except that a mixture of 560 milliliters of methanol and 140 milliliters of acetone was employed in place of methanol. The liquid in the reactor was analyzed by gas chromotography to contain 30.0 grams of 2,2-dimethoxypropane. After filtration, there was obtained 82.20 grams of a mixture which analysis showed contained 80.25 grams of benzophenone 4,4'-dicarboxylic acid and 1.95 grams of benzophenone 2,4'-dicarboxylic acid. The color of the product was improved somewhat and was only slightly yellow.

Trat a diether is more effective for the defined purpose than a mixture of alcohol and a carbonyl-containing compound can be seen from the following.

EXAMPLE IV

The run of Example I was repeated except that 50 grams of the same crude benzophenone dicarboxylic acid mixture was subjected to treatment and 350 milliliters of 2,2-dimethoxypropane was employed in place of methanol. After filtration, there was obtained 40.6 grams of a mixture which analysis showed contained 40.3 grams of benzophenone 4,4'-dicarboxylic acid and 0.3 gram of benzophenone 2,4'-dicarboxylic acid. The product obtained was near white. In this run, as well as the preceding runs, the disappearance of some of the benzophenone 4,4'-dicarboxylic acid can be attributed to some apparent solubility in the treating medium as well as to handling losses.

In Examples V, VI and VII which follow, the terephthalic acid mixture that was subjected to treatment therein was obtained as follows. A mixture of 35.4 grams of para xylene, 315 grams of glacial acetic acid, 20 grams of cyclohexane, and 8.0 grams of cobaltous acetate tetrahydrate was reacted with oxygen at a temperature of 90° C. for a period of 34 hours. The reaction product was filtered to recover 42.7 grams of solid crude terephthalic acid, having a neutral equivalent of 90.5. From the filtrate 5.7 grams of para toluic acid were obtained along with the catalyst after evaporation of the acetic acid. Example V and VI below show the results obtained when methanol and acetone, respectively, are employed to separate the defined impurities from a mixture containing the same and terephthalic acid.

EXAMPLE V

Into a 300 milliliter stirred stainless steel autoclave a slurry of 10.0 grams of crude terephthalic acid, having a neutral equivalent of 90.5 (theoretical value for pure terephthalic acid is 83.05) and 150 milliliters of methanol were charged. The mixture was heated to a temperature of 145° C. for a period of one hour at a resulting pressure of 165 pounds per square inch gauge. After cooling to room temperature the mixture was then filtered. The resulting solid was dried in a vacuum oven at 150° C. and a vacuum of 20 inches of mercury. 7.8 grams of purified terephthalic acid, having a neutral equivalent of 84.1, was obtained in this manner. The product, however, characterized by its high neutral equivalent, is not sufficiently pure for polymer applications. Evaporation of the filtrate, followed by drying the resulting solid in the vacuum oven under the above conditions, produced 2.2 grams of solid having a neutral equivalent of 125.4. This material was found by infrared and gas chromatographic analysis to consist essentially of para toluic acid (theoretical neutral equivalent 136.14) containing 0.43 gram of terephthalic acid.

EXAMPLE VI

The run of Example V was repeated except that 150 milliliters of acetone was employed in place of methanol. After filtration 8.1 grams of purified terephthalic acid having a neutral equivalent of 86.4 was obtained. As evidenced by its high neutral equivalent the terephthalic acid after treatment with acetone again is too impure for polymer applications. The acetone-soluble portion, after evaporation and drying, amounted to 2.0 grams having a neutral equivalent of 192. Analysis by infrared spectroscopy and gas chromatography shows this fraction to be a mixture of para toluic acid, 0.11 gram of terephthalic acid and a polymeric oil, the latter resulting from aldol type condensations of acetone.

That a synergistic effect is obtained when a mixture of the defined alcohol and the defined carbonyl-containing compound is employed rather than either one alone is further shown by the following.

EXAMPLE VII

The run of Example V was again repeated except that a mixture of 65 milliliters of acetone and 81 milliliters of methanol was employed in place of methanol alone. The liquid in the reaction mixture was analyzed by gas chromatography and found to contain 7.2 grams of 2,2-dimethoxypropane. After filtration 8.5 grams of pure terephthalic acid having a neutral equivalent of 83.11 was obtained, which is suitable for polymer applications. It is therefore evident that the combination of acetone and methanol is more effective in achieving the desired purification and that this cannot be attained with either of the two solvents alone. The acetone-soluble portion, after evaporation and drying, amounted to 1.5 grams having a neutral equivalent of 130.2. It was analyzed to be a mixture of para toluic acid containing 0.24 gram of terephthalic acid.

EXAMPLE VIII

That the defined diether can be obtained herein only when the reaction of the alcohol and the carbonyl-containing compounds is catalyzed by the presence of the benzophenone dicarboxylic acids or the terephthalic acid mixture is apparent from the following. Into a one-liter stirred stainless steel autoclave there was placed 560 milliliters of methanol and 140 milliliters of acetone, and the mixture was heated at a temperature of 140° C. and at a pressure of 140 pounds per square inch gauge over a period of one hour. After cooling to room temperature and atmospheric pressure the mixture was analyzed by gas chromatography, but no dimethoxypropane was found.

Obviously, many modifications and variations of the invention as hereinabove set forth can be made without departing from the spirit and scope thereof.

We claim:

1. A process for separating terephthalic acid from a mixture containing the same, which mixture has been obtained as a result of the oxidation of para xylene with an oxidant selected from the group consisting of molecular oxygen and nitric acid, which comprises treating said mixture with a diether defined by the following formula:

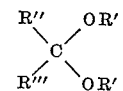

wherein R' is an alkyl group having from one to five carbon atoms and R" and R''' are selected from the group consisting of hydrogen and alkyl groups having from one to four carbon atoms and thereafter removing terephthalic acid from the resulting mixture.

2. A process for purifying terephthalic acid in a mixture obtained as a result of the oxidation of para xylene with an oxidant selected from the group consisting of molecular oxygen and nitric acid which comprises treating said mixture with 2,2-dimethoxypropane.

3. A process for purifying terephthalic acid in a mixture obtained as a result of the oxidation of para xylene with an oxidant selected from the group consisting of molecular oxygen and nitric acid which comprises treating said mixture with 2,2-dimethoxypropane at a temperature of about 40° to about 300° C.

4. A process for purifying terephthalic acid in a mixture obtained as a result of the oxidation of para xylene with an oxidant selected from the group consisting of molecular oxygen and nitric acid which comprises treating said mixture with 2,2-dimethoxypropane at a temperature of about 100° to about 200° C.

5. A process for purifying terephthalic acid in a mixture obtained as a result of the oxidation of para xylene with an oxidant selected from the group consisting of molecular oxygen and nitric acid which comprises treating said mixture with a mixture consisting essentially of methanol and acetone.

6. A process for purifying terephthalic acid in a mixture obtained as a result of the oxidation of para xylene with an oxidant selected from the group consisting of molecular oxygen and nitric acid which comprises treating said mixture with a mixture consisting essentially of methanol and acetone at a temperature of about 40° to about 300° C.

7. A process for purifying terephthalic acid in a mixture obtained as a result of the oxidation of para xylene with an oxidant selected from the group consisting of molecular oxygen and nitric acid which comprises treating said mixture with a mixture consisting essentially of methanol and acetone at a temperature of about 100° to about 200° C.

References Cited

UNITED STATES PATENTS 3,370,088   2/1968   Lese et al. _____ 260—517

BERNARD HELFIN, *Primary Examiner.*